US011627006B1

(12) United States Patent
Chew et al.

(10) Patent No.: US 11,627,006 B1
(45) Date of Patent: Apr. 11, 2023

(54) UTILIZING A VIRTUAL ASSISTANT AS A MEETING AGENDA FACILITATOR

(71) Applicant: Amazon Technologies, Inc., Seattle, WA (US)

(72) Inventors: Hwee Hong Christopher Chew, Seattle, WA (US); Chhaya Pandey, Seattle, WA (US); Divyang Mahendrabhai Upadhyay, Bellevue, WA (US); Brad Murphy, Seattle, WA (US); Sadie Mackay, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 147 days.

(21) Appl. No.: 16/586,773

(22) Filed: Sep. 27, 2019

(51) Int. Cl.
*H04L 12/18* (2006.01)
*G10L 15/18* (2013.01)
*G10L 15/22* (2006.01)

(52) U.S. Cl.
CPC ...... *H04L 12/1818* (2013.01); *G10L 15/1822* (2013.01); *G10L 15/22* (2013.01); *H04L 12/1831* (2013.01)

(58) Field of Classification Search
None
See application file for complete search history.

(56) References Cited

U.S. PATENT DOCUMENTS

| 2011/0107236 | A1* | 5/2011 | Sambhar | H04L 12/1827 715/753 |
| 2014/0082100 | A1* | 3/2014 | Sammon | G06Q 10/109 709/206 |
| 2019/0073640 | A1* | 3/2019 | Udezue | G06Q 10/107 |
| 2019/0189117 | A1* | 6/2019 | Kumar | G06F 16/3329 |
| 2020/0242151 | A1* | 7/2020 | Adlersberg | G06F 16/483 |
| 2021/0021558 | A1* | 1/2021 | Mahmoud | H04L 51/22 |

* cited by examiner

*Primary Examiner* — Antim G Shah
(74) *Attorney, Agent, or Firm* — Lee & Hayes, P.C.

(57) ABSTRACT

Technologies are disclosed for to utilizing a virtual assistant to as a meeting agenda facilitator. The virtual assistant may start the meeting, control the flow of the meeting, introduce agenda items, receive comments, display meeting materials associated with the meeting, generate/keep track of follow-up actions, create a meeting record, and the like. In some examples, virtual assistant accesses a meeting agenda to determine what agenda items are to be discussed, what content is to be presented, as well as summaries of the meeting and the agenda items. The meeting agenda may also include an expected duration of each of the agenda items that may be used to keep the meeting on time. The virtual assistant may also generate follow-up actions to be performed. Still yet, the virtual assistant may create a meeting record that can include information recorded from the meeting and is associated with the agenda items discussed.

20 Claims, 9 Drawing Sheets

UTILIZING A VIRTUAL ASSISTANT AS A MEETING AGENDA FACILITATOR

BACKGROUND

Today, users may utilize a variety of different tools to facilitate meetings. For example, a user may use a virtual meeting tool to create a virtual meeting that links participants together using video and/or audio. In other examples, a user may use presentation software to assist in presenting information during a meeting. For instance, a user might present slides, video, audio, or other content, during a meeting. In yet other examples, a user might generate a recording of the meeting.

Even though different tools exist to assist users in scheduling and facilitating meetings, these tools may difficult to use or learn, and may not be very effective in practice. For example, while some users may be proficient in running meetings and utilizing various meeting tools, other users may not be as comfortable either acting as the meeting facilitator and/or using the available meeting tools.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
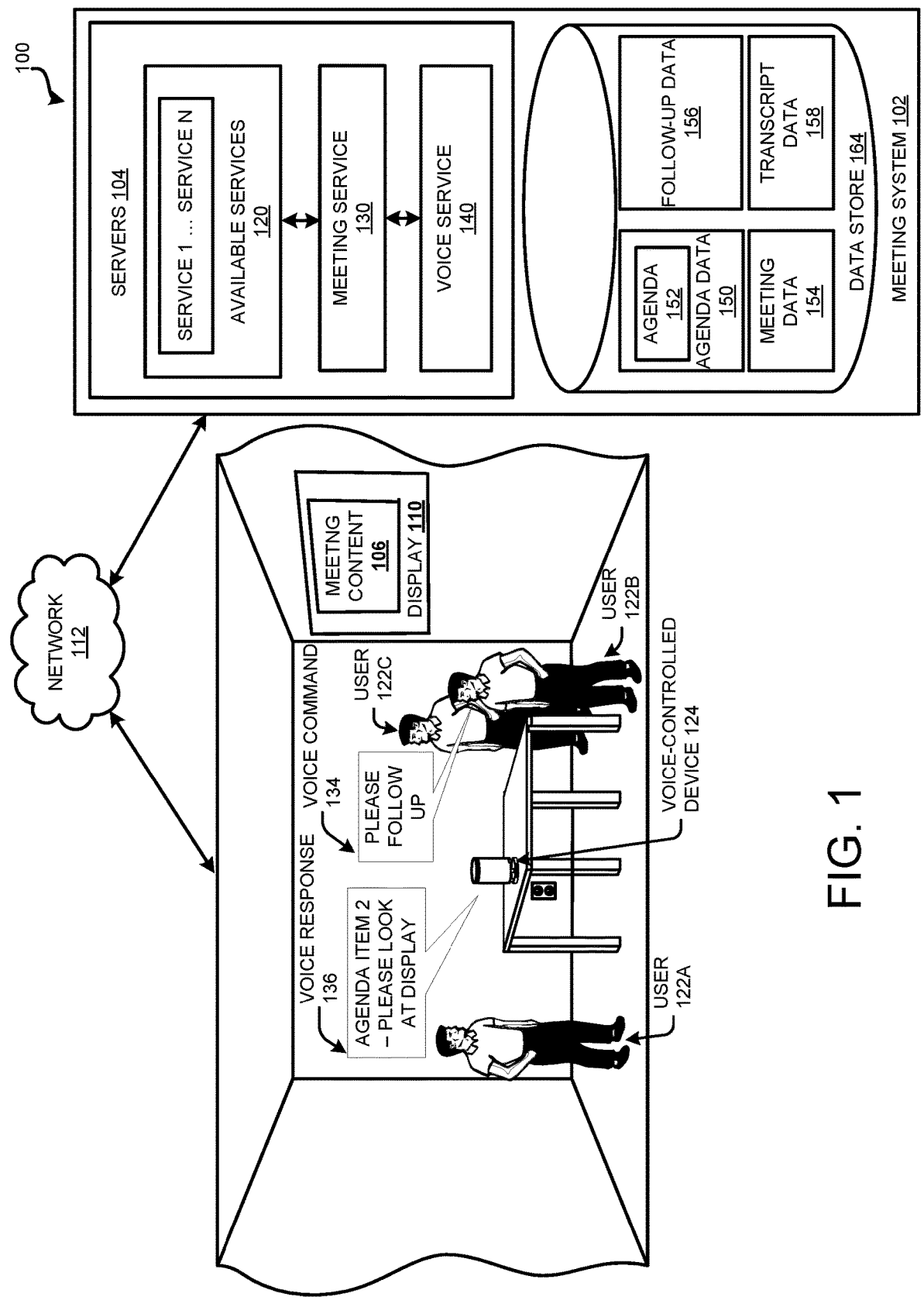
FIG. 1 is a software and network architecture diagram showing aspects of the configuration and utilization of a meeting system that utilizes a virtual assistant as a meeting agenda facilitator.

The following detailed description is directed to technologies for utilizing a virtual assistant as a meeting agenda facilitator. Utilizing techniques described herein, a virtual assistant utilizes one or more services provided by a service provider network to facilitate a meeting between users. As used herein a "meeting agenda facilitator" or a "meeting facilitator" may include acting as the meeting chairperson (e.g., running the meeting), or acting in a more limited role as an assistant to a meeting chairperson. The meeting may be a meeting in which users or "participants" attend in person, attend virtually, or some combination of in person attendance and virtual attendance. Generally, the virtual assistant acting as a meeting facilitator may start the meeting, control the flow of the meeting, introduce agenda items, receive comments from participants, display meeting materials associated with the meeting (e.g., meeting content such as slides, videos, pictures, . . . ), generate/keep track of follow-up actions, create a meeting record, and the like.

In some examples, a virtual assistant may utilize a meeting agenda when facilitating the meeting. The meeting agenda may be utilized by the virtual assistant to provide an overview of the meeting, provide information about agenda items, move to an agenda item at the appropriate time during the meeting, and the like. Generally, a "virtual assistant" as used herein refers to software and/or hardware that receives input from a user and completes tasks or performs other operations for the user. As described herein, the virtual assistant is configured to understand natural language voice commands and complete tasks for the user, such as acting as a meeting agenda facilitator. For example, a virtual assistant may allow users to request information about the meeting, invite others to the meeting, book a follow-up meeting, and/or perform other actions. In some examples, the virtual assistant listens for speech from users in an environment where the meeting is occurring. In other examples, the virtual assistant may listen for speech that is received from a remote connection (e.g., over a phone, a computer, . . . ).

In some configurations, the virtual assistant may act as the meeting chairperson. In other words, the virtual assistant may run the meeting. In other examples, the virtual assistant may act as an assistant to a meeting chairperson, to assist during the meeting. According to some examples, a meeting agenda may be provided to the virtual assistant, or made available to the virtual assistant, at some time before the meeting. The meeting agenda may include various information about the meeting (e.g., a summary of the meeting, agenda items, summary of agenda items, presentation material associated with agenda items, a list of meeting participants, a meeting start time, a meeting end time, durations for agenda items, and the like). In some configurations, the meeting agenda may be included (or linked or identified in some other manner) in a meeting invitation that is sent to the virtual assistant, and/or associated with a calendar, mailbox, or some other data store that is accessible by the virtual assistant. In other examples, the virtual assistant may access the meeting agenda using some other technique.

According to some examples, the meeting agenda can be structured using simple annotations, created using one or more templates, created using a meeting agenda generation tool, and the like. For example, a user may select a template and supply information about the meeting to create a meeting agenda for a meeting. In some configurations, meeting agenda items can be listed as bullet items, numerated items, and/or labeled using some other format such that the agenda items for the meeting can be determined. Generally, any format may be utilized that is understood by functionality accessed by the virtual assistant.

As briefly discussed above, a time duration of an agenda item may be included in the meeting agenda or specified some other way. If a duration per agenda item is included within the meeting agenda or specified in some other way, the virtual assistant may utilize the duration as a time checkpoint to announce that the time is ending for the current agenda item and announce that the meeting will be moving to the next agenda item. In some examples, the virtual assistant may ask for comments and/or follow-up action items before moving to the next agenda item.

If a duration of an agenda item is not specified, the virtual assistant can estimate the duration per agenda item (e.g., based on the total time of the meeting, the time left for the meeting, . . . ). For example, if there are four agenda items and the meeting is scheduled for one hour, then each of the four agenda items may be allocated fifteen minutes each. In some configurations, the virtual assistant may learn from previous meetings that have the same or similar agendas that certain agenda items take longer than other agenda items and set the durations based on the learned times.

In other examples, the virtual assistant may determine that the participants of the meeting are discussing content that is not related to the current agenda item. For instance, the virtual assistant may use natural language processing (NLP) and/or natural language understanding (NLU) techniques to identify the content that is currently being discussed. According to some configurations, the NLP and/or NLU techniques may identify that the participants are discussing the current agenda item, another agenda item included within the agenda, and/or content that is not related to an agenda item within the agenda. According to some configurations, when it is determined that the participants are talking about another agenda item, the virtual assistant may move to the agenda item that is being discussed. When it is determined that the participants are discussing other content that is not associated with an agenda item, the virtual assistant may associate a new agenda item with this portion of the meeting and/or tag the content currently being discussed in some other manner (e.g., indicate that the content is not related to the current agenda item).

In some examples, the virtual assistant may join the meeting at the scheduled time, via audio, video, or both. In other examples, a participant, may request the virtual assistant to join a meeting. For instance, the participant may say to the virtual assistant "Assistant, join the meeting" or "Assistant, start the meeting". Once joined, the virtual assistant can ask the participants (or a specified participant(s)) whether they would like to start the meeting. If the meeting is to be started, the meeting agenda may be parsed (e.g., analyzed, examined) to identify the agenda items. For example, the meeting agenda items can be listed as bullet items, numerated items, and/or labeled using some other format such that the agenda items for the meeting can be easily determined when the meeting agenda is parsed. In other examples, a meeting participant may request the virtual assistant to act as a meeting facilitator. For instance, a participant may say "Assistant, chair the meeting" or "Assistant, facilitate the meeting" regardless of whether a meeting has been started or is in progress.

According to some configurations, the virtual assistant may provide an overview of the meeting and agenda items (e.g., at the start of the meeting and/or when requested) and announce specific agenda items (and possibly a brief summary of the agenda item) as the meeting progresses. In other configurations, the virtual assistant may provide one or more visual indicators that provide information associated with the agenda items. For example, the virtual assistant may highlight content, provide visual content for display that indicates information about the agenda item, and the like.

In some examples, the virtual assistant acts as a meeting timekeeper to help ensure that the agenda items specified in the meeting agenda are covered timely. For example, the virtual assistant at the appropriate time may say "Time to move on to the next agenda item (along with a short description of the agenda item')".

Throughout the meeting, a participant can ask the virtual assistant a variety of questions and/or instruct the virtual assistant to perform an action. For instance, a participant may ask the virtual assistant: "Assistant, what's the (full) agenda of the meeting?" or "Assistant, what's the objective of the meeting?". In response, the virtual assistant may provide a list of the agenda items and/or a specified objective of the meeting. In some examples, a participant may ask what the key agenda items are (e.g., "Assistant, what are the key agendas of the meeting?"). In response, the virtual assistant may provide the agenda items that are indicated to be the key items. In some configurations, the key agenda items may be identified based on various information, such as location of the agenda item within the meeting, a duration of agenda items, an importance associated with an agenda item, and the like.

As briefly mentioned above, the meeting agenda may include or indicate presentation material that is associated with one or more of the agenda items. For example, the meeting agenda may include links to content (e.g., documents, slides, videos, pictures, audio, . . . ). According to some techniques, the associated presentation material is presented/provided at the appropriate time during the meeting. For instance, if a video is associated with the second agenda item, the virtual assistant may cause the video to be played during the duration associated with the second agenda item. In some examples, the presentation may be provided to one or more presentation device(s), such as but not limited to computing device(s) associated with the participants, presentation device(s) in a room in which one or more of the participants are located (e.g., a smart television, or some other presentation device), and the like.

Throughout the meeting, the virtual assistant may keep track of what agenda items have been covered and generate follow-up actions to be performed with one or more of the agenda items, or the meeting in general. For example, the virtual assistant may identify that a specific agenda item was not covered (e.g., a participant that was supposed to lead the discussion of the agenda item was not present or time ran out to cover the agenda item) during the meeting and inquire to the participants whether a follow-up meeting is to be scheduled. If yes, the virtual assistant can schedule a follow-up meeting (e.g., book one or more conference rooms), and send a meeting invitation to the participants with the agenda topic(s) to be covered in the follow-up meeting. According to some examples, the virtual assistant may update an already scheduled meeting to include the agenda item(s) not covered in the current meeting. For instance, when the meeting is a recurring meeting, the virtual assistant can update the next scheduled meeting with the agenda item(s) not covered. The virtual assistant may also receive requests from participants to perform a follow-up action. For example, a participant may ask the virtual assistant to remind them to make changes to a document and provide those changes to the meeting participants. In other examples, a participant may ask a follow-up meeting with a portion of the meeting participants.

According to some configurations, the virtual assistant may generate a meeting record. As used herein, a "meeting record" can include various information recorded during the meeting and/or information associated with the meeting. In some examples, a meeting record can include an audio and/or video recording of the meeting, a transcript of the meeting, a summary of the meeting, content presented or discussed during the meeting, follow-up items, and the like. In contrast to just creating a recording of the meeting, the meeting record may associate different parts of the recording with the different agenda items. According to some configurations, data associated with the meeting might be indexed within a search index that is searchable at team level or a wider organization level according to user preferences. In this way, a user may locate the relevant content more quickly. Similarly, a user may access the meeting record to see the presentation material, any follow-up items, and the like.

According to some techniques, the virtual assistant may update one or more meeting agendas based on input received during a current meeting. For example, if a decision is made to add a new agenda item to a recurring meeting, the virtual assistant may modify the associated agenda for the next recurring meeting. The virtual assistant might also include a follow-up in a future meeting to determine that the requested follow-up actions were performed by one or more of the meeting participants. For instance, were the "to-do" items completed.

According to some configurations, the virtual assistant attempts to determine an identity of the requesting user providing the speech. For instance, the virtual assistant may be configured to identify the speech of employees of a company, other authorized users, and the like. In this way, when the user authorizes access to their data via an "opt-in" authorization procedure, the virtual assistant may determine data that are associated with the user. For instance, the virtual assistant may identify one or more calendars, messaging applications, task lists, and the like that are associated with the user. In some configurations, the virtual assistant identifies speakers using voice profiles described in more detail below. As used herein, an "authorized user" refers to a user that is identified (e.g., by the virtual assistant) and that is determined to be authorized to interact with the meeting service.

According to some examples, the virtual assistant may access other service to obtain data that may be used to assist the virtual assistant in facilitating the meeting. For example, the virtual assistant might access a calendar service, a messaging service, a task service, and/or other services. Additional details regarding the various components and processes described briefly above for utilizing a virtual assistant as a meeting agenda facilitator will be presented below with regard to FIGS. 1-9.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization a meeting system 102 that utilizes a virtual assistant as a meeting agenda facilitator. It is to be appreciated that the environment 100 is merely illustrative and that the various configurations disclosed herein can be utilized in many different types of computing environments.

To provide the meeting service 130 and the other functionality disclosed herein, the meeting system 102 may include one or more servers 104. The servers 104 can execute software components to provide the services described herein, including meeting service 130 functionality using a virtual assistant and different services provided by a service provider and/or some other entity. The software components can execute on a single server 104 or in parallel across multiple servers in the meeting system 102. In addition, a software component can consist of subcomponents executing on different servers 104 or other computing devices in the meeting system 102. Various components can be implemented as software, hardware, or any combination of the two. In this regard, it is to be appreciated that the meeting system 102 shown in FIG. 1 has been simplified for discussion purposes and that many additional software and hardware components can be utilized.

A user 122 of the meeting system 102 can utilize a virtual assistant, via a voice-controlled device 124 or some other input device, to access the meeting system 102 through a network 112. According to some configurations, the virtual assistant is configured to understand natural language voice commands and complete tasks for the user, such as tasks related to acting as a facilitator of a meeting as described herein. As illustrated, one or more users 122, such as user 122A, user 122B, and user 122C may be participants of a meeting that utilizes a virtual assistant as a meeting facilitator. While the users 122 are shown in the same room, other users may be in other locations and may "virtually" attend the meeting according to some examples. In some examples, the users 122 are customers of a service provider network.

The voice-controlled device 124 is an input device configured to receive voice queries/commands/utterances (which may collectively be referred to herein as "voice commands") from the user and provide data to a virtual assistant. The voice-controlled device 124 may include one or more microphones for capturing audio data (e.g., voice utterances or commands of users) within an environment 100 and generating audio signals that represent or are otherwise associated with sound (e.g., the audio data) from the environment 100, including the voice utterances/commands of the users.

The voice-controlled device 124 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, a telephone, a telephone conferencing device, video conferencing device, or any other type of computing device capable of connecting to the network 112 and communicating with the meeting system 102. In other configurations, the voice-controlled device 124 may be configured to communicate with one or more other devices to receive voice commands from users and/or perform processing related to functionality of the meeting system 102.

In some configurations, the voice-controlled device 124 may be configured to perform speech recognition, such as automatic speech recognition (ASR), on the audio signals to identify words or phrases associated with the voice commands therein or may be configured to provide the audio signals to another device (e.g., a remote service such as meeting system 102) for performing the ASR on the audio signals for identifying the voice commands. In other examples, ASR may be performed by a different computing system and/or service.

As used herein, performing ASR on an audio signal to identify a voice command may include translating speech represented in the audio signal into text and analyzing the text to identify the voice command. Analysis of the text may be performed, locally by the voice-controlled device 124 and/or remotely by the one or more servers 104 (or other remote services), using natural language processing (NLP) and/or natural language understanding (NLU) techniques in order to determine an intent associated with the voice command.

As illustrated in FIG. 1, the users 122 may interact with the voice-controlled device 124 within the environment 100 by using voice commands. For instance, a user 122B may make a request to the voice-controlled device 124 that is associated with a virtual assistant to follow-up on a particular agenda item during a meeting (e.g., "Please Follow Up") as indicated by voice command 134. Many other voice commands 134 can be utilized to interact with the virtual assistant and the meeting system 102, such as "Please list the agenda items", "Please provide a summary of the meeting", "Please join Frank to the meeting", "Please change agenda item 2 in the next meeting to be 15 minutes", and the like. In each example, the voice-controlled device 124 may interact with one or more remote services, discussed below, to receive and provide and utilize data related to meetings.

As illustrated, the voice-controlled device 124, or some other device or component, may couple with a meeting system 102 over a network 112. The network 112 may represent an array or wired networks, wireless networks (e.g., Wi-Fi), or combinations thereof. The meeting system 102 may generally refer to a network-accessible platform implemented as a computing infrastructure of processors, storage, software, data access, and so forth that is maintained and accessible via the network 112, such as the Internet. These services may not require end-user knowledge of the physical location and configuration of the system that delivers the services. Common expressions associated with these remote services, such as the meeting system 102, include "on-demand computing", "software as a service (SaaS)", "platform computing", "network accessible platform", and so forth.

As illustrated, the meeting system 102 may comprise one or more network-accessible resources, such as servers 104. These resources comprise one or more processors and computer-readable storage media executable on the processors. In some configurations, the users 122 may be identified and/or authenticated before interacting with the voice-controlled device 124 that is associated with the meeting system 102. In some examples, the voice-controlled device 124 is awakened upon identifying a predefined wake word. After being awakened, the voice-controlled device 124 may upload an audio signal representing sound captured in the environment 100 to the meeting system 102 over the network 112.

In other configurations, the virtual assistant provided via the voice-controlled device 124 may be awoken using some other technique. In response to receiving this audio signal, the voice service 140 may perform ASR, NLU, and/or NLP on the audio signal to identify one or more user voice commands therein. For instance, in the illustrated example, the voice service 140 may identify the user 122 interacting with the voice-controlled device 124.

The network 112 can be a local-area network ("LAN"), a wide-area network ("WAN"), the Internet, or any other networking topology known in the art that connects the user devices to the meeting system 102. The user 122 can use an application (not shown) executing on voice-controlled device 124 to access and utilize the meeting service functionality provided by the servers 104. In some examples, the application is a web browser application (not shown), such as the Amazon® Silk® web browser, or some other web browser. Generally, a web browser application exchanges data with the servers 104 in the meeting system 102 using the hypertext transfer protocol ("HTTP") over the network 112. The application might also be a stand-alone client application configured for communicating with the servers 104.

The client application can also utilize any number of communication methods known in the art to communicate with the meeting system 102 and/or the servers 104 across the network 112, including remote procedure calls, SOAP-based web services, remote file access, proprietary client-server architectures, and the like. According to some configurations, the application may provide a user interface that can be utilized by the user 122 to configure settings associated with the meeting service and/or the voice-controlled device 124. Typically, a user 122 interacts with the voice-controlled device 124 using speech that is captured by one or more microphones of the voice-controlled device 124.

The voice service 140, or some other component may process a corresponding audio signal associated with the audio data/voice command to determine words within the voice command (using automatic speech recognition techniques—ASR) and to determine an intent of the user (natural language processing techniques—NLU). Based on the identified words/intent, the voice service 140 can determine whether the voice command is related to the meeting service 130 and/or some other service or functionality.

As briefly discussed above, the voice-controlled device 124 may act as an input device for a virtual assistant for users, such as users 122. A user, such as users 122, may interact with the voice-controlled device 124 to access functionality of the meeting system 120 using voice commands 134. Generally, any voice command 134 that relates to a meeting may be uttered by a user 122 to access functionality of the meeting service 130. A voice command 134 may be uttered by a user 122, captured by one or more microphones of the voice-controlled device 124, and stored by the voice-controlled device 124 and/or one or more remote devices/services. In other embodiments, the user 122 may input the voice command 134 via one or more input mechanisms (e.g., a keyboard, a display, etc.) or via a gesture that is captured by one or more cameras (e.g., video cameras).

Upon receipt of the voice-command 134, the voice-controlled device 124, and/or the voice service 140, and/or some other component or service (local or remote from the voice-controlled device 124), may attempt to identify the speaker. According to some configurations, the voice service 140 compares the voice command 134 to voice profiles already created. The voice profiles may be stored in a data store, such as data store 164, associated with the meeting system 102 and/or on the voice-controlled device 124, or some other location.

Generally, if the voice service 140 determines a match between a voice signature determined from the voice command 134 and a stored profile, an identity of the user 122 is determined. A match may be based on one or more audio attributes. For example, the voice service 140 may compared audio attributes such as, but not limited to volume, pitch, tone, and the like. When no match is made, the voice-controlled device 124 may provide output to the user indicating that they are not recognized. In some examples, the voice-controlled device may provide the unrecognized user 122 an option to be identified using some other mechanism (e.g., logging into a system, providing further details, . . . ).

In the current example, user 122B is recognized to be an authorized user of the voice-controlled device 124. According to some examples, more than one user may be an authorized user of the voice-controlled device 124. For example, all or a portion of the employees of an enterprise, as well as other users, may be authorized. In response to user 122 providing voice command 134, the voice-controlled device 124 may provide a voice response (e.g., "What type of follow-up action would you like?", or some other message) (not shown). In some configurations, information generated by the meeting service 130, or some other component or device that is located remotely from the voice-controlled device 124, may be stored locally such that if the meeting service 130 is not accessible for some period of time, the voice-controlled device 124 may access the information that may be processed locally by the voice-controlled device 124 or some other computing device.

In addition to providing auditory information, the voice-controlled device 124 and/or some other device in the environment 100, may provide other types of information, such as visual information. For instance, the voice-controlled device 124 might display meeting content 106 on a computing device, such as display 110, that is within the environment 100.

As discussed above, a virtual assistant utilizes one or more services provided by a service provider network to facilitate a meeting between users, such as users 122A, 122B, and 122C. The virtual assistant may start the meeting, control the flow of the meeting, introduce agenda items, receive comments from participants, display meeting materials associated with the meeting (e.g., meeting content such as slides, videos, pictures, . . . ), generate/keep track of follow-up actions, create a meeting record, and the like.

In some examples, a virtual assistant may utilize a meeting agenda 152 to facilitate the meeting. The meeting agenda 152 may be utilized by the virtual assistant to provide an overview of the meeting, provide information about agenda items, move to an agenda item at the appropriate time during the meeting, and the like. In the current example, the virtual assistant has caused the voice-controlled device 124 to indicate via voice response 136 that agenda item 2 is currently being discussed and has informed the users 122 that the display is presenting meeting content 106 that is associated with the current agenda item. In other examples, the virtual assistant may communicate with the users 122 using some other mechanism. For instance, the virtual assistant may display content on the display 110, provide content to an application on a computing device associated with a user 122 (not shown), and the like.

As also discussed above, the virtual assistant may act as a meeting chairperson, or play a more limited role as a co-facilitator, or assistant. According to some examples, a meeting agenda 152 is may be provided to the virtual assistant, or made available to the virtual assistant, at some time before the meeting. In some configurations, the meeting service 130 accesses a meeting agenda 152 from agenda data 150 stored within a data store 164. The meeting agenda 152 is described in more detail with reference to FIG. 2.

In some configurations, the virtual assistant may act as a timekeeper. In the example illustrated in FIG. 1, the virtual assistant has moved to agenda item 2 as indicated by voice response 136. The virtual assistant may move to a next agenda item based on a specified time (e.g., as included in an agenda), an estimated time (e.g., based on total time for the meeting, remaining time of the meeting, and number of agenda items to cover), and/or in response to a request from a user 122. For instance, a user 122 may request to move to an agenda item. In some configurations, a user may request to cover an agenda item out of order (e.g., the user 122 must leave early and would like to participate in the discussion for a particular agenda item).

According to some configurations, when the virtual assistant determines that a participant that is indicated to lead the discussion of a particular agenda is not present, the virtual assistant may perform a variety of actions. For instance, the virtual assistant may move the agenda item to a later time in the meeting, ask whether another participant may lead the discussion for the agenda item, generate a follow up action to move the agenda item to another meeting, and the like.

In some examples, before moving to the next agenda item, the virtual assistant may ask for comments and/or follow-up action items. For example, the virtual assistant may utilize the voice-controlled device 124 to ask the users 122 "Would anyone like to say any further comments before we move to the next agenda item?", and/or "Any follow-up actions related to this agenda item?", and the like.

In some examples, the virtual assistant may join the meeting at the scheduled time (e.g., as indicated by a calendar invitation). In other examples, a user 122, may request the virtual assistant to join a meeting. For instance, one of the users 122A, 122B, or 122C may say to the virtual assistant "Assistant, join the meeting" or "Assistant, start the meeting". Once joined, the virtual assistant can ask the users 122 (or a specified participant(s)) whether they would like to start the meeting. If the meeting is to be started, the meeting agenda 152 may be accessed by the meeting service 130 and parsed to identify the agenda items to be covered during the meeting. In other examples, user 122 may request the virtual assistant to act as a meeting facilitator. For instance, a user 122 may say "Assistant, chair the meeting" or "Assistant, facilitate the meeting" regardless of whether a meeting has been started or is in progress.

According to some configurations, the virtual assistant may provide an overview of the agenda items (e.g., at the start of the meeting and/or when requested) and announce specific agenda items (and possibly a brief summary of the agenda item) as the meeting progresses. In the current example, the virtual assistant is providing information relating to agenda item 2. According to some examples, the meeting service 130 may provide data to the voice-controlled device 124, or some other device to audibly output information about the meeting and the agenda items. In other examples, the meeting service 130 may transmit data to the voice-controlled device 124, or some other device, such as display 110 for a visual display of information about the meeting and the agenda items.

Throughout the meeting, a user 122 can ask the virtual assistant a variety of questions and/or instruct the virtual assistant to perform an action. For instance, a participant may ask the assistant: "Assistant, what's the (full) agenda of the meeting?", "Assistant, what's the objective of the meeting?". In response, the virtual assistant may provide a list of the agenda items specified in the agenda 152 and/or a specified objective of the meeting. In some examples, a user 122 may ask what the key agenda items are (e.g., "Assistant, what are the key agendas of the meeting?"). In response, the virtual assistant may provide the agenda items that are indicated to be the key items. In some configurations, the key agenda items may be identified based on various information, such as location of the agenda item within the meeting agenda 152, a duration of agenda items, an importance associated with an agenda item, and the like.

As briefly mentioned above, the meeting agenda 152 may identify presentation material that is associated with one or more of the agenda items. In the current example illustrated in FIG. 1, the virtual assistant has caused meeting content 106 to be presented on display 110 during the discussion of agenda item 2. The meeting content 106 may be any type of content that can be presented on the display 110, or some other computing device. The virtual assistant via one or more computers of the meeting system 102 may also cause the meeting content 106 to be provided to one or more remote devices associated with one or more remote participants of the meeting.

Throughout the meeting, the virtual assistant may keep track of what agenda items have been covered and generate follow-up actions to be performed with one or more of the agenda items, or the meeting in general. For example, the virtual assistant may identify that a specific agenda item was not covered during the meeting and inquire to the participants whether a follow-up meeting is to be scheduled. If yes, the virtual assistant can cause the meeting service 130, or some other service 120, to generate follow-up data 156 that is associated with the follow-up action to perform (e.g., create a follow-up meeting, change an agenda 152, assign a task to one or more of the users 122, and the like). More details are provided below with reference to FIG. 2.

According to some configurations, the virtual assistant may generate a meeting record that can be stored as meeting data 154 in data store 164, or some other location. As described above, a meeting record can include an audio and/or video recording of the meeting, a transcript of the meeting, content presented or discussed during the meeting, follow-up items, and the like. In contrast to just creating a recording of the meeting, the meeting service 130, or some other component or service, may generate a meeting record and associate different parts of the meeting data 154 with the different agenda items. In this way, a user 122 may locate the relevant content more quickly. Similarly, a user 122 may access the meeting record to see the presentation material, any follow-up items, and the like.

According to some configurations, the virtual assistant attempts to determine an identity of a user 122 providing the speech. For instance, the virtual assistant may be configured to identify the speech of employees of a company, other authorized users, and the like. In this way, when the user authorizes access to their data via an "opt-in" authorization procedure, the virtual assistant may determine data that are associated with the user. For instance, the virtual assistant may identify one or more calendars, messaging applications, task lists, and the like that are associated with the user 122.

Figure 2:
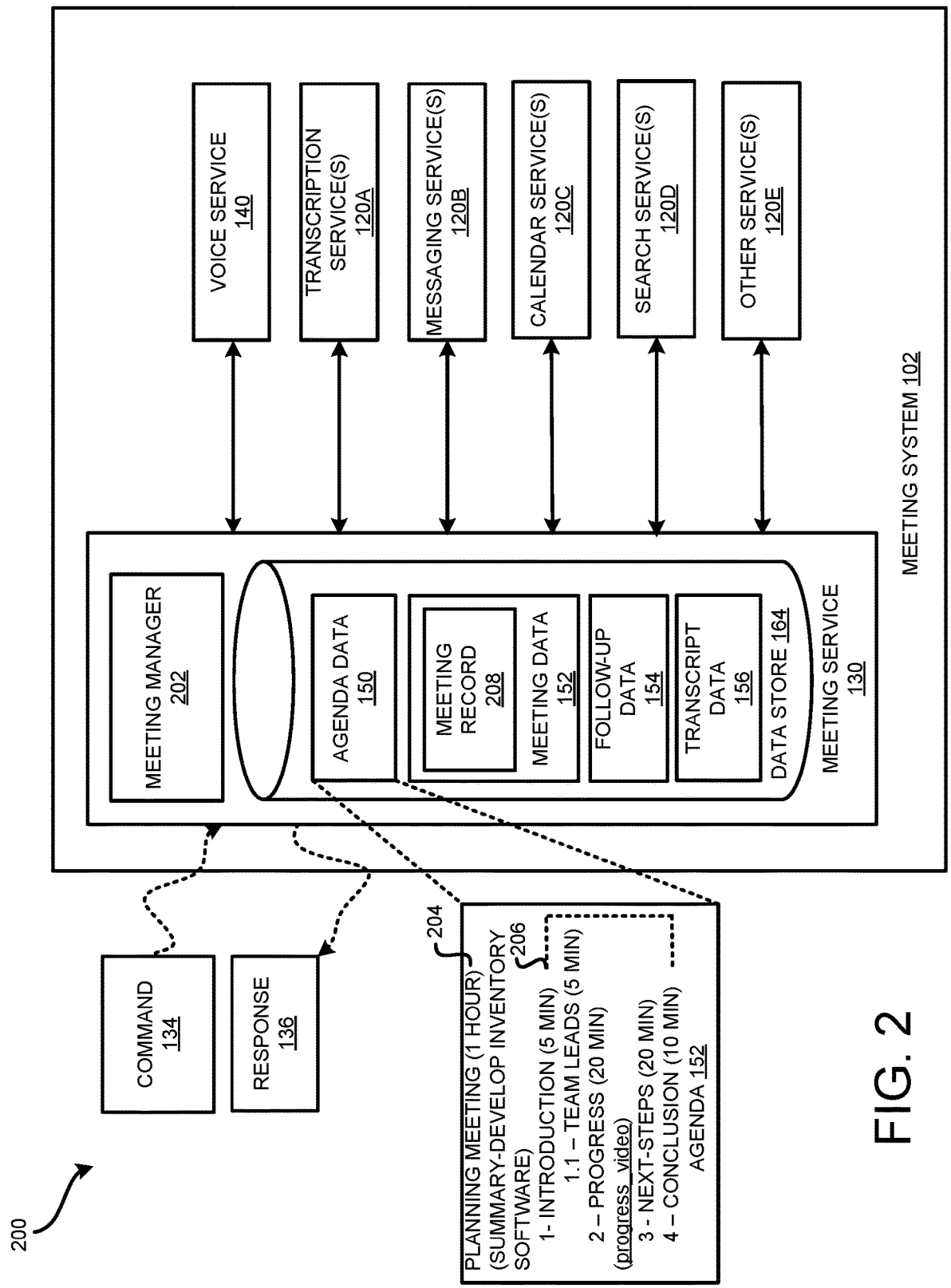
FIG. 2 is a software and network architecture diagram showing aspects of a meeting system that utilizes various services associated with a service provider to facilitate a meeting using a virtual assistant.

According to some examples, the meeting service 130 may access other available services 120 to obtain data that may be used by the meeting service 130 (See FIG. 2 and related discussion). Additional details regarding the various processes described above with regard to FIG. 1 will be provided below with regard to FIGS. 2-9.

FIG. 2 is a software and network architecture diagram showing aspects of a meeting system that utilizes various services 120 associated with a service provider network to facilitate a meeting using a virtual assistant and other services associated with the service provider network, or some other entity. It is to be appreciated that the environment 200 is merely illustrative and that the various configurations disclosed herein can be utilized in many different types of computing environments. FIG. 2 is similar to FIG. 1 but provides more details regarding the agenda 152 and different services 120 that can be utilized by the meeting system 102.

As illustrated, meeting system 102 includes meeting service 130, voice service 140, transcription service(s) 120A, messaging service(s) 120B, calendar service(s) 120C, search service(s) 120D, and other services 120E. The meeting service 130 may communicate with the services using one or more Application Programming Interfaces (APIs) (not shown) exposed by one or more of the services. In some examples, each service may expose one or more APIs that can be used by the meeting service 130, or some other component, to access functionality and/or data provided by the service.

As briefly discussed above, the meeting manager 202 and/or the meeting service 130 may also access other service(s) to assist in facilitating a meeting. According to some configurations, the meeting service 130 is configured to access calendar service(s) 120C to obtain data of one or more work calendars, or other calendars, associated with the virtual assistant, and/or one or more of the users 122. For example, calendar data provided by calendar service(s) 120C may be used by the meeting service 130 to determine when a meeting is occurring and identify a meeting agenda 152. In some configurations, the meeting service 130 may utilize a calendar service 120C to schedule a meeting, such as a follow-up meeting.

According to some examples, the meeting manager 202 may also access one or more messaging service(s) 120B. For instance, the meeting manager 202 may send messages using one or more of the messaging service(s) 120B. The meeting service 120B may also access messaging data received from one or more of the messaging service(s) 120B to identify content associated with one or more meetings. In other configurations, an authorized user, such as user 122, may authorize ("opts-in") the meeting service 130 access to content of messages (e.g., emails, text messages, . . . ) of the user 122. According to this example, the meeting service 130 may access the content of one or more messages of the user 122 to determine message content that indicates meeting information associated with one or more meetings.

According to some configurations, the meeting service 130 may also access one or more search service(s) 120D. As briefly discussed above, the meeting service 130 may utilize the search service(s) 120D for including data associated with the meeting record 208 in one or more search indexes that is searchable by one or more of the search service(s) 120D.

In some examples, a user 122 may search for a particular agenda item by issuing a query to one or more search service(s) 120D.

The voice service 140 may include a voice interface that may comprise one or more components configured to receive audio signals generated by the voice-controlled device 124 and perform ASR, NLP, and/or NLU on the audio signals to identify users and voice commands.

In some examples, the meeting manager 202 accesses the meeting agenda 152 from agenda data 150 that may be stored in data store 164, or some other location. As discussed above, the meeting agenda 152 may include various information about a meeting. For example, the meeting agenda 152 may include but is not limited to a summary of the meeting, agenda items, summary of agenda items, presentation material associated with agenda items, a list of meeting participants, a meeting start time, a meeting end time, durations for agenda items, and the like. In some configurations, the meeting agenda 152 may be included (or linked or identified in some other manner) in a meeting invitation that is sent to the virtual assistant by a messaging service 120B, a calendar service 120C, and/or associated with a calendar, mailbox, or some other data store that is accessible by the virtual assistant.

According to some examples, the meeting agenda 152 can be structured using simple annotations, created using one or more templates, created using a meeting agenda generation tool, and the like. For example, a user may select a template and supply information about the meeting to create a meeting agenda for a meeting. In some configurations, meeting agenda items can be listed as bullet items, numerated items, and/or labeled using some other format such that the agenda items for the meeting can be determined. Generally, any format may be utilized that is understood by functionality accessed by the virtual assistant.

In the example illustrated in FIG. 2, the meeting agenda 152 includes a title of the meeting 204 that includes a time for the meeting (e.g., 1 hour), and a summary of the meeting (e.g., "Develop Inventory Software") and agenda items 206. As illustrated, the agenda items 206 are listed as numerated items and include a title of the agenda item along with a desired duration for discussing the agenda item. In other examples, the agenda items may include other information, such as but not limited to summary information, user information, and the like.

As briefly mentioned above, the meeting agenda 152 may identify presentation material that is associated with one or more of the agenda items. For example, the meeting agenda may include links to content (e.g., documents, slides, videos, pictures, audio, . . . ). In the current example, agenda item 2 within agenda items 206 includes a link to presentation content "progress video" that is to be played during the discussion of agenda item 2.

As also briefly discussed, the virtual assistant may identify that a specific agenda item was not covered during the meeting and inquire to the participants whether a follow-up meeting is to be scheduled. If yes, the virtual assistant can utilize the meeting manager 202 to utilize calendar service 120C to schedule a follow-up meeting (e.g., book one or more conference rooms), and send a meeting invitation to the participants with the agenda topic(s) to be covered in the follow-up meeting. Similarly, the meeting manager 202 may access follow-up data to determine other follow-up action items to perform. For example, the follow-up data 154 may indicate to message one or more of the users using messaging service 120B.

According to some configurations, the meeting manager 202 can be utilized to generate a meeting record 208 for the meeting. In some examples, the meeting record 208 is stored as meeting data 152 in the data store 164. In some examples, a meeting record 208 can include an audio and/or video recording of the meeting, a transcript of the meeting, content presented or discussed during the meeting, follow-up items, and the like. In contrast to just creating a recording of the meeting, the meeting record 208 may associate different parts of the recording with the different agenda items. According to some examples, the meeting manager 202 utilizes one or more transcription services 120A to generate transcript data 156 for the meeting. In this way, a user may locate the relevant content more quickly. Similarly, a user may access the meeting record to see the presentation material, any follow-up items, and the like.

In some configurations, the other service(s) 120E may include a vision service (not shown) that may include a vision interface to identify requests of users 122 made via user gestures and route the requests to the appropriate domain. In some examples, the vision service may be used by the meeting manager 202 to identify and/or authenticate a user. The other service(s) 120E may provide other functionality not specifically discussed herein.

FIGS. 3-6 are flow diagrams showing illustrative routines 300, 400, 500, and 600 for utilizing a virtual assistant as a meeting agenda facilitator, according to examples disclosed herein. It should be appreciated that the logical operations described herein with respect to FIG. 3, FIG. 4, FIG. 5, FIG. 6, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

Figure 3:
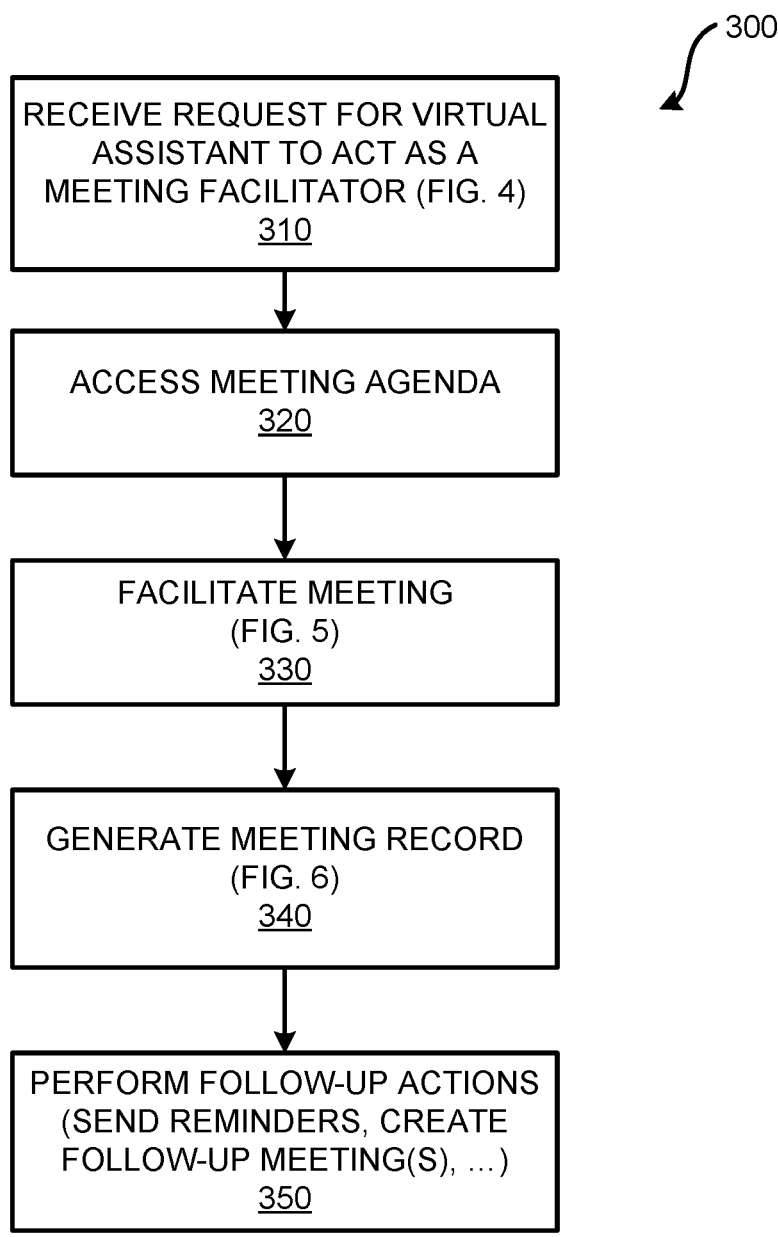
FIG. 3 is a flow diagram showing an illustrative routine for utilizing a virtual assistant as a meeting agenda facilitator.

FIG. 3 is a flow diagram showing an illustrative routine for utilizing a virtual assistant as a meeting agenda facilitator. At 310, a request for a virtual assistant to act as a meeting facilitator is received. As discussed above, a user 122 may provide a voice command 134 that requests the virtual assistant to act as a meeting facilitator, the virtual assistant may receive a request via a meeting invitation, the virtual assistant may receive a request via a user interface (UI), or the like. Generally, the voice command 134, or the meeting invitation, or the request via the UI, includes one or more terms, or other data, provided by the user 122 that are used by the meeting service 130 to identify whether the virtual assistant is requested to act as a chairperson for the meeting and/or perform a more limited role. In so examples, a user interface can be provided for submitting the request to the meeting service 130.

In other examples, the meeting system 102 may cause a voice-controlled device 124 to audibly output audio data prompting a user 122 to provide the voice command 134.

For instance, via one or more speakers of the voice-controlled device 124, the meeting system 102 may cause the voice-controlled device 124 to audibly output, "Would you like me to start the meeting?" or something similar.

The voice command 134 may be audibly uttered by the user 122, which is captured by one or more microphones of the voice-controlled device 124. Regardless of how the voice command 134A is provided by the user 122, the voice-controlled device 124 and/or the meeting system 102 may process the voice command 134, possibly using one or more speech recognition techniques (ASR) or one or more natural language processing techniques (NLU) in order to determine an intent associated with the voice command 134 (See FIG. 4).

At 320, the meeting agenda 152 is accessed. As discussed above, the virtual assistant may access the meeting agenda 152 from a data store 164, or from some other data source. In some examples, the meeting agenda 152 is provided to the virtual assistant via a meeting invitation, a message, or using some other mechanism.

At 330, the meeting is facilitated by the virtual assistant. As discussed above, the virtual assistant may act as the chairperson and/or perform a more limited assistant role. For instance, the virtual assistant may introduce agenda items 152, keep track of follow-up actions to perform, record details of the meeting, and the like. More details are provided below with reference to FIG. 5.

At 340, a meeting record 208 is generated. As discussed above, the meeting service 130 may generate a meeting record 208 for the meeting. In some examples, the meeting record 208 includes a recording of the meeting, inputs received during the meeting, material presented during the meeting, indexed according to the associated agenda item. More details are provided below with reference to FIG. 6.

At 350, any follow-up actions are performed. As discussed above, the meeting service 130, via the virtual assistant, or some other device or component may perform any follow-up actions identified during the meeting. For instance, the meeting service 130 may send reminders to participants or other users, create follow-up meetings, adjust future agendas based on input received by the meeting service 130 during the meeting, provide documents to participants or other users, and the like.

Figure 4:
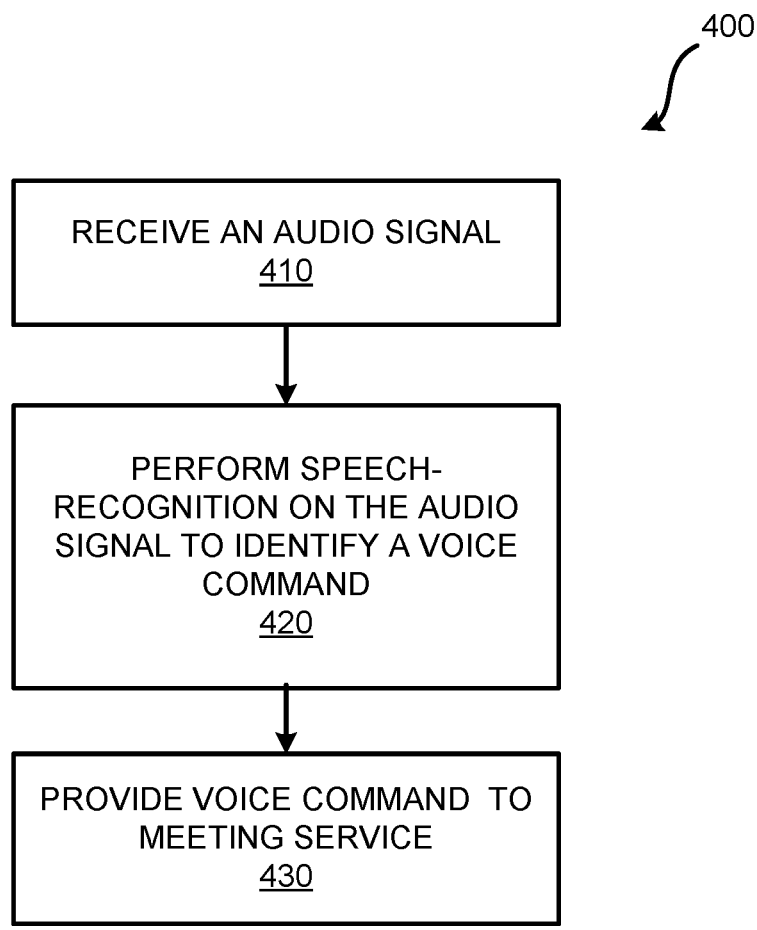
FIG. 4 is a flow diagram showing an illustrative routine for processing an auditory input associated with a virtual assistant.

FIG. 4 is a flow diagram showing an illustrative routine 400 for processing an auditory input associated with a virtual assistant, according to examples disclosed herein.

The routine 400 begins at 410, where an audio signal is received. In some configurations, the audio signal is received from a voice-controlled device 124. The audio signal may include a voice command 134 of a user interacting with the virtual assistant who is acting as a facilitator of a meeting. In some configurations, the user 122 may be identified. As discussed above, the meeting service 130, and/or some other component or service, may identify the user 122 by comparing stored voice signatures/profiles of previously identified users. In some examples, the identity of the user 122 may be determined using some other technique or mechanism. For example, a vision service may visually identify the user 122.

At 420, speech-recognition on the audio signal is performed to identify the voice command 134 of the user 122. As discussed above, the voice-controlled device 124, the voice service 140, and/or some other component or device may determine whether the audio signal includes a voice command associated with the meeting and/or the audio signal includes additional information or requests for the virtual assistant to perform.

At 430, data associated with the voice command 134 is provided to the meeting service 130. For example, the voice service 140 may determine that the user 122 has requested summary information about the meeting, or that the user 122 is requesting a follow-up action.

Figure 5:
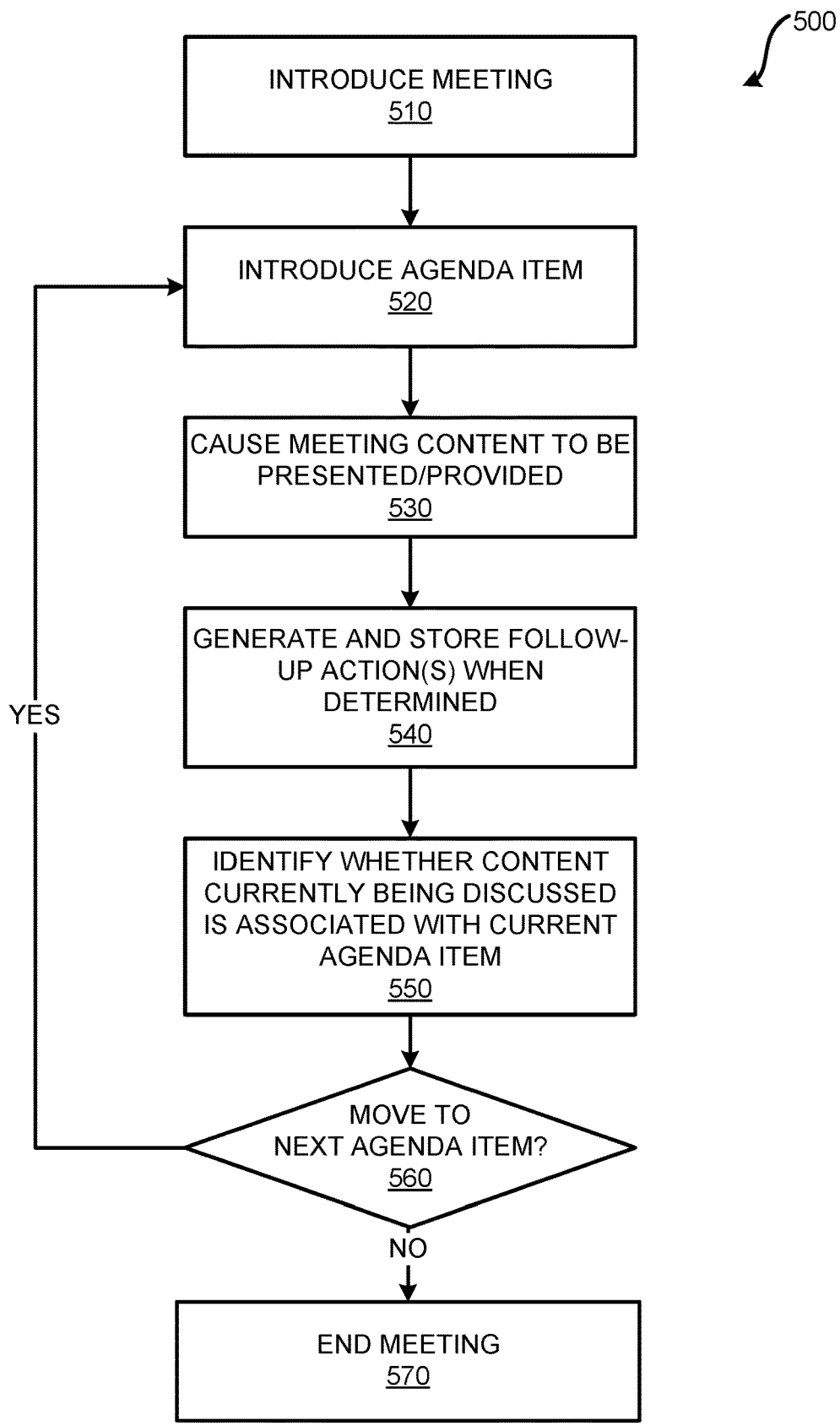
FIG. 5 is a flow diagram showing an illustrative routine for facilitating a meeting utilizing a virtual assistant.

FIG. 5 is a flow diagram showing an illustrative routine 500 for facilitating a meeting utilizing a virtual assistant, according to examples disclosed herein.

At 510 the virtual assistant introduces the meeting. As discussed above, the meeting service 130 may utilize the voice-controlled device 124, or some other device, to provide an introduction for the meeting. In some examples, the meeting service 130 causes the voice-controlled device 124 to utter a summary of the meeting along with a brief description of each of the agenda items. In some configurations, the meeting service 130 may also cause the agenda 152 to be provided on a visual display.

At 520, an agenda item is introduced. As discussed above, the meeting service 130 may determine to move to an agenda item based on a current time, or some other indication to move to another agenda item. In some examples, the time associated with an agenda item is specified in a meeting agenda 152. In other examples, the time may be determined by the meeting service 130, and/or some other device or component.

At 530, meeting content 106 associated with the agenda item being discussed can be presented/provided to meeting participants. As discussed above, the virtual assistant, via the voice-controlled device 124, or some other device or component may cause presentation material (e.g., audio, video, slides, . . . ) to be displayed/output on one or more computing devices.

At 540, follow-up actions can be generated and stored during discussion of a current agenda item. As discussed above, a participant may request that the virtual assistant create a follow-up action such as, but not limited to assigning one or more task(s) to participants, scheduling a follow-up meeting, obtaining/updating material, and the like. In other examples, the virtual assistant may automatically generate one or more follow-up actions based on information identified during the meeting. For example, the virtual assistant may determine that a particular agenda item was not covered during the meeting and cause a follow-up meeting to be scheduled or modified to cover the agenda item.

At 550, the content currently being discussed during the meeting is identified to determine whether the content is associated with the agenda item the current agenda item, a different agenda item, or some other content. As discussed above, the virtual assistant may determine that the participants of the meeting are discussing content that is not related to the current agenda item. For instance, the virtual assistant, the meeting service 130, or some other device or component, may use natural language processing (NLP) and/or natural language understanding (NLU) techniques to identify that the participants are discussing the current agenda item, another agenda item included within the agenda, and/or content that is not related to an agenda item within the agenda. According to some configurations, when it is determined that the participants are talking about another agenda item, the virtual assistant may move to the agenda item that is being discussed. When it is determined that the participants are discussing other content that is not associated with an agenda item, the virtual assistant may associate a new agenda item with this portion of the meeting and/or tag the content currently being discussed in some other manner (e.g., indicate that the content is not related to the current agenda item).

At 560, a decision is made as to whether to move to a next agenda item. As discussed above, the decision may be based on a current time, a duration of the current agenda item, and/or some other input received that indicates to move to the next agenda item. When it is decided to move to the next agenda item, the process 500 returns to 520. When it is not decided to move to the next agenda item, the process 500 moves to 560.

At 570, the meeting is ended. As discussed above, the meeting service 130 may utilize the voice-controlled device 124, or some other device, to end the meeting. In some examples, the meeting service 130 causes the voice-controlled device 124 to audibly utter or otherwise output (e.g., visually via a display) a summary of what was discussed at the meeting along with follow-up actions.

Figure 6:
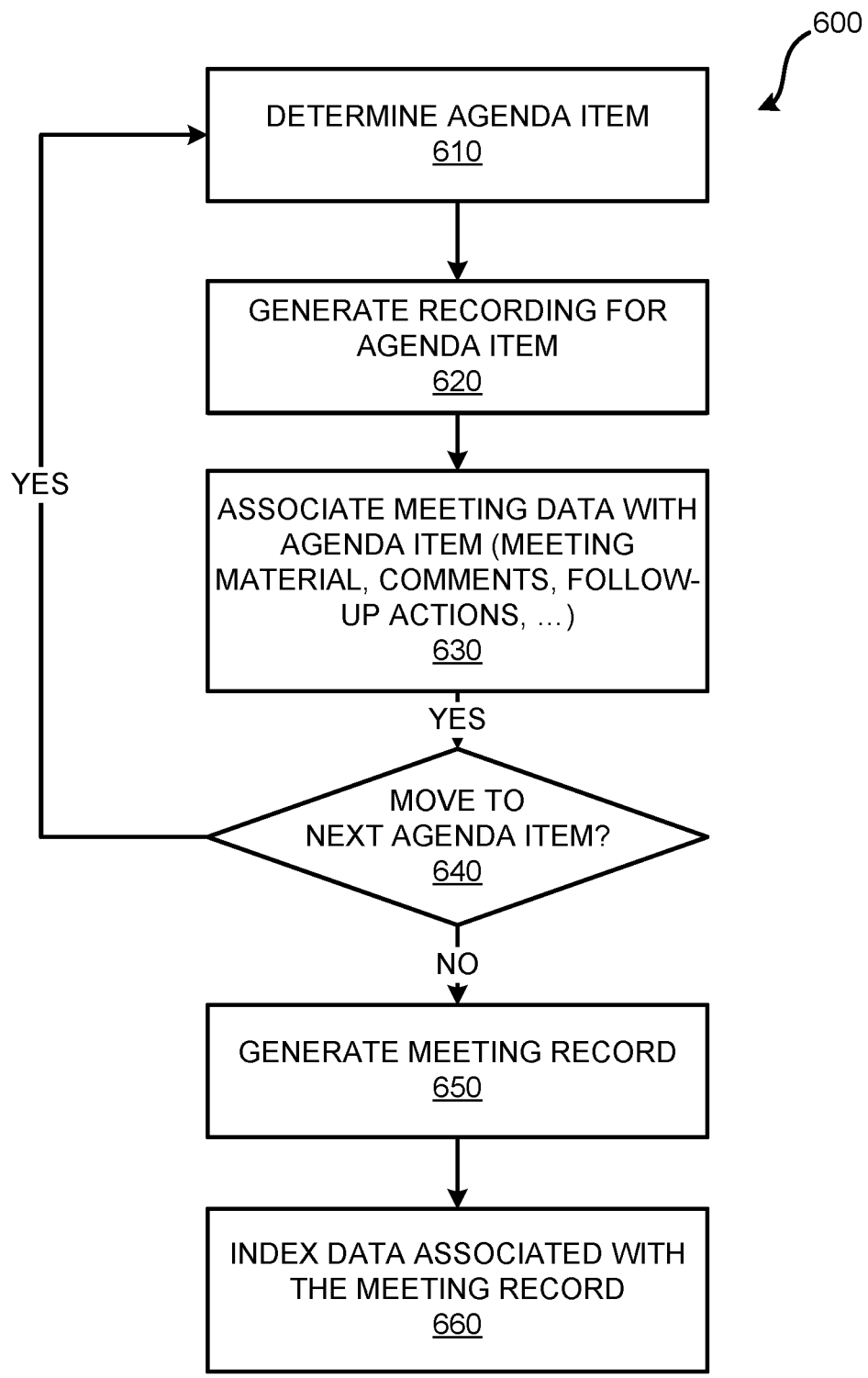
FIG. 6 is a flow diagram showing an illustrative routine for generating a meeting record.

FIG. 6 is a flow diagram showing an illustrative routine 600 for generating a meeting record, according to examples disclosed herein.

At 610, a current agenda item is determined. As discussed above, the meeting service 130 may access a meeting agenda 152 that is associated with the current meeting to determine the agenda items associated with the meeting. In some configurations, the meeting service 130 keeps track of the current agenda item being discussed and a time to move to the next agenda item based on the duration of the current agenda item and/or input received from an authorized participant to move to the next agenda item.

At 620, a recording of the agenda item may be generated. As discussed above, the voice-controlled device 124, and/or one or more other computing devices, may capture sound during the meeting.

At 630, meeting data may be associated with the current agenda item. As discussed above, other data, such as inputs to a UI specifying one or more commands 134, voice commands by participants to perform follow-up actions, presentation of material during the current agenda item, and the like, may be obtained and associated with the current agenda item. According to some examples, the meeting service 130 associates one or more indicators with the recording and/or a transcript of the recording that specifies what agenda item the recording and other meeting data is associated with.

At 640, a decision is made as to whether to move to a next agenda item. As discussed above, the decision may be based on a current time, a duration of the current agenda item, and/or some other input received that indicates to move to the next agenda item. When it is decided to move to the next agenda item, the process 600 returns to 610. When it is not decided to move to the next agenda item, the process 600 moves to 650.

At 650, a meeting record 208 is generated. As discussed above, a meeting record 208 can include recordings associated with the agenda items, as well as other meeting data such as, but not limited to meeting content presented during the meeting, comments made during the meeting, follow-up actions, and the like.

At 660, data associated with the meeting record is indexed. As discussed above, the meeting service 130 may utilize the search service(s) 120D to generate one or more search indexes that include information about the meeting. In this way, an authorized user, such as a participant of the meeting, may utilize one or more search engines to search for content associated with one or more meetings.

Figure 7:
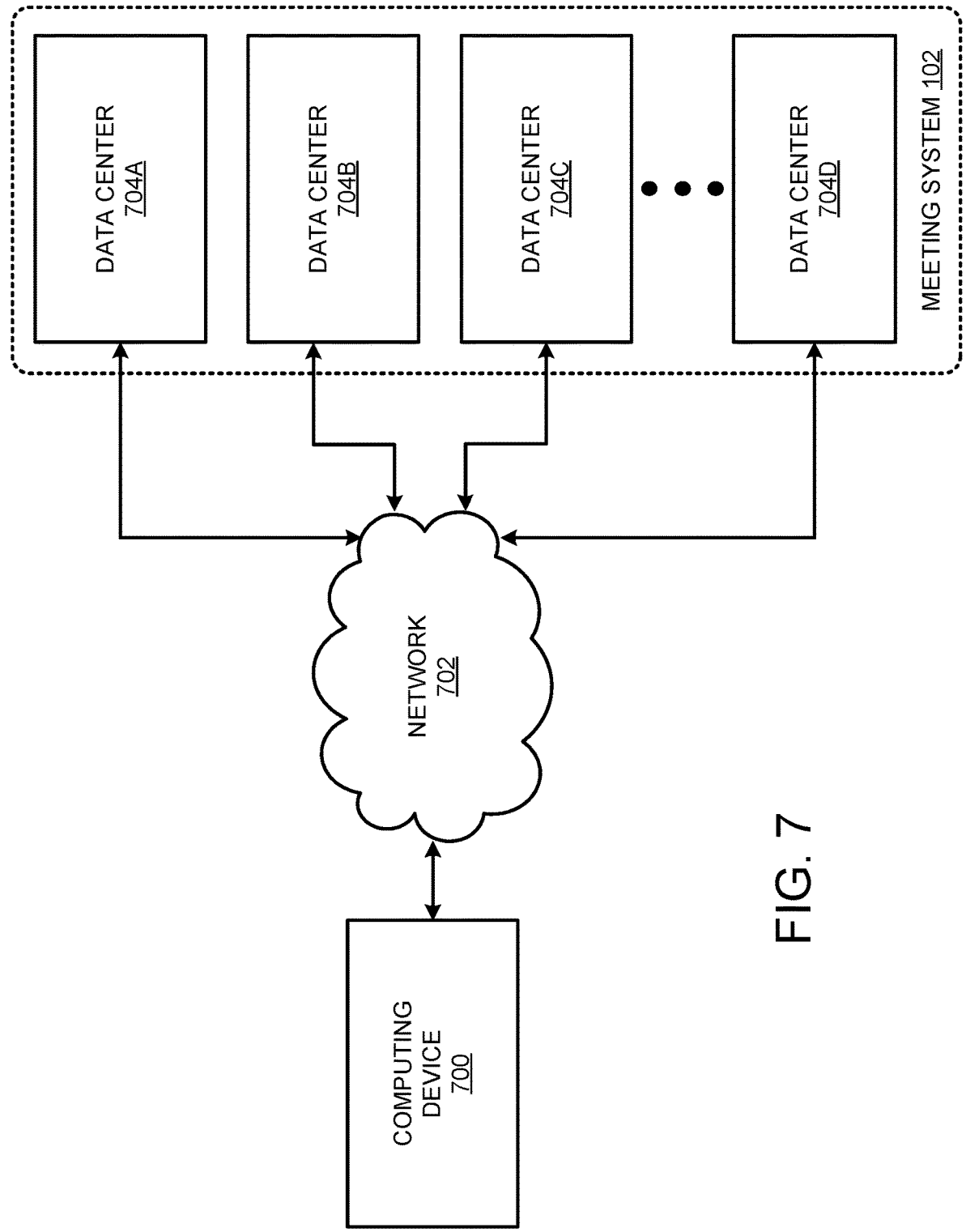
FIG. 7 is a system and network diagram that shows an illustrative operating environment including several data centers that can be configured to implement aspects of the functionality described herein.

FIG. 7 is a system and network diagram that shows one illustrative operating environment for the configurations disclosed herein that includes a meeting system 102 that can be configured to provide the functionality described above. As discussed above, the meeting system 102 can execute network services that provide computing resources for implementing the functionality disclosed herein. The computing resources implemented by the meeting system 102 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The meeting system 102 can also include and utilize other types of computing resources not mentioned specifically herein.

As also discussed above, the computing resources provided by the meeting system 102 are enabled in one implementation by one or more data centers 704A-704D (which might be referred to herein singularly as "a data center 704" or collectively as "the data centers 704"). The data centers 704 are facilities utilized to house and operate computer systems and associated components. The data centers 704 typically include redundant and backup power, communications, cooling, and security systems. The data centers 704 can also be located in geographically disparate locations. One illustrative configuration for a data center 704 that can be utilized to implement the technologies disclosed herein will be described below with regard to FIG. 9.

The users can access the services provided by the meeting system 102 over a network 702, which can be a wide area communication network ("WAN"), such as the Internet, an intranet or an Internet service provider ("ISP") network or a combination of such networks. For example, and without limitation, a computing device 700 operated by a user or other user of the meeting system 102, such as the voice-controlled device 124, can be utilized to access the meeting system 102 by way of the network 702. It should be appreciated that a local-area network ("LAN"), the Internet, or any other networking topology known in the art that connects the data centers 704 to remote users and other users can be utilized. It should also be appreciated that combinations of such networks can also be utilized.

Figure 8:
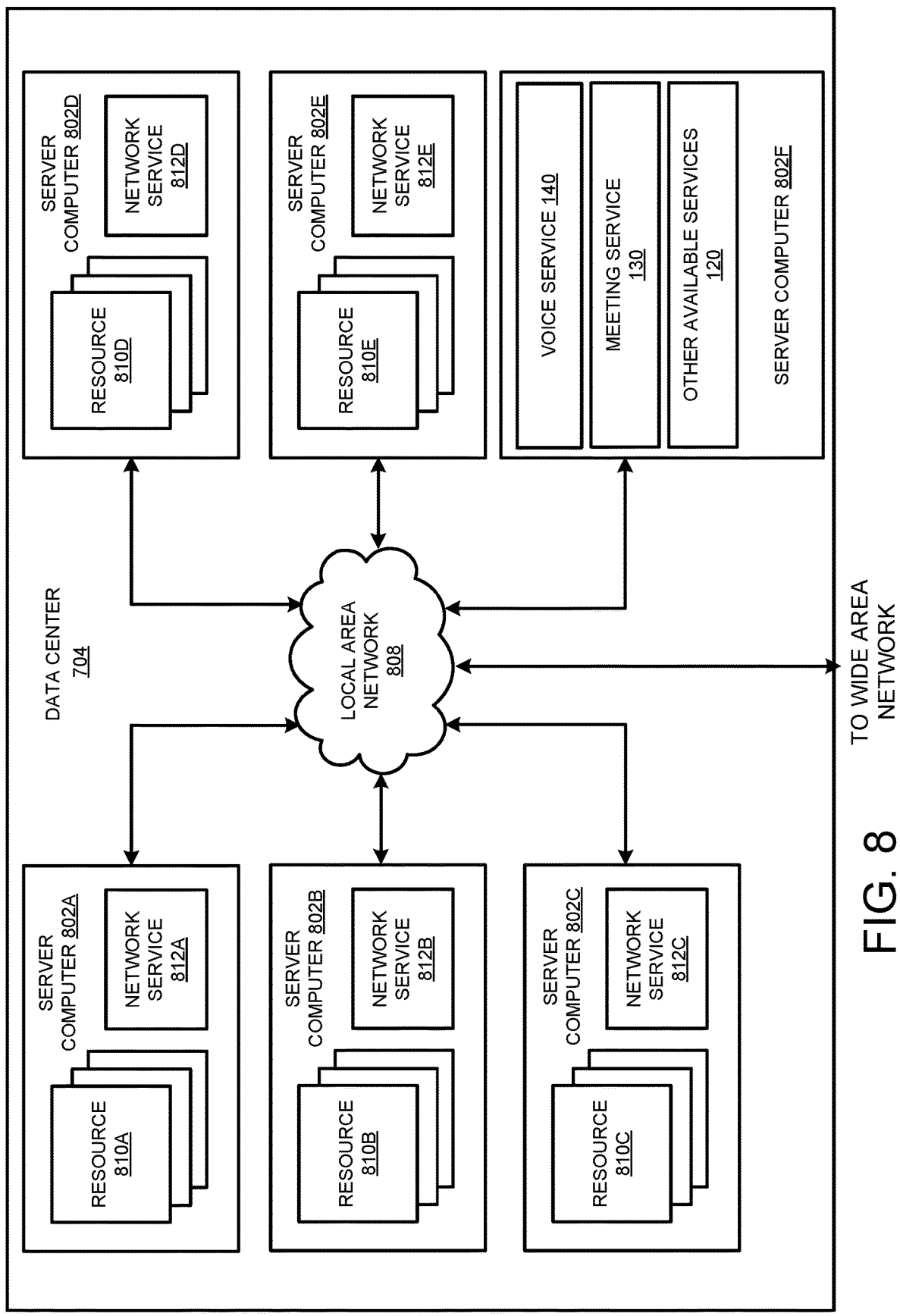
FIG. 8 is a computing system diagram illustrating a configuration for a data center that can be utilized to implement aspects of the technologies disclosed herein.

FIG. 8 is a computing system diagram that illustrates examples for a data center 804 that can be utilized to implement the voice service 140, the meeting service 130, other available services 120, and the other functionality disclosed herein. The example data center 804 shown in FIG. 8 includes several server computers 802A-802F (which might be referred to herein singularly as "a server computer 802" or in the plural as "the server computers 802").

The server computers 802 can be standard tower, rack-mount, or blade server computers configured appropriately for providing various types of computing resources 810 for implementing the functionality disclosed herein. As mentioned above, the computing resources 810 provided by the data center 704 can be data processing resources such as VM instances or hardware computing systems, data storage resources, database resources, networking resources, and others. Some of the servers 802 can also be configured to execute network services 812A-812-E, respectively, capable of instantiating, providing and/or managing the computing resources 810A-810E.

The data center 704 shown in FIG. 8 also includes a server computer 802F that can execute some or all of the software components described above. The server computer 802F can also be configured to execute other components and/or to store data for providing some or all of the functionality described herein. In this regard, it should be appreciated that components or different instances of the services can execute on many other physical or virtual servers in the data centers 704 in various configurations.

In the example data center 704 shown in FIG. 8, an appropriate LAN 808 is also utilized to interconnect the server computers 802A-802F. The LAN 808 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704D, between each of the server computers 802A-802F in each data center 704, and, potentially, between computing resources 810 in each of the data centers 704. It should be appreciated that the configuration of the data center 704 described with reference to FIG. 8 is merely illustrative and that other implementations can be utilized.

Figure 9:
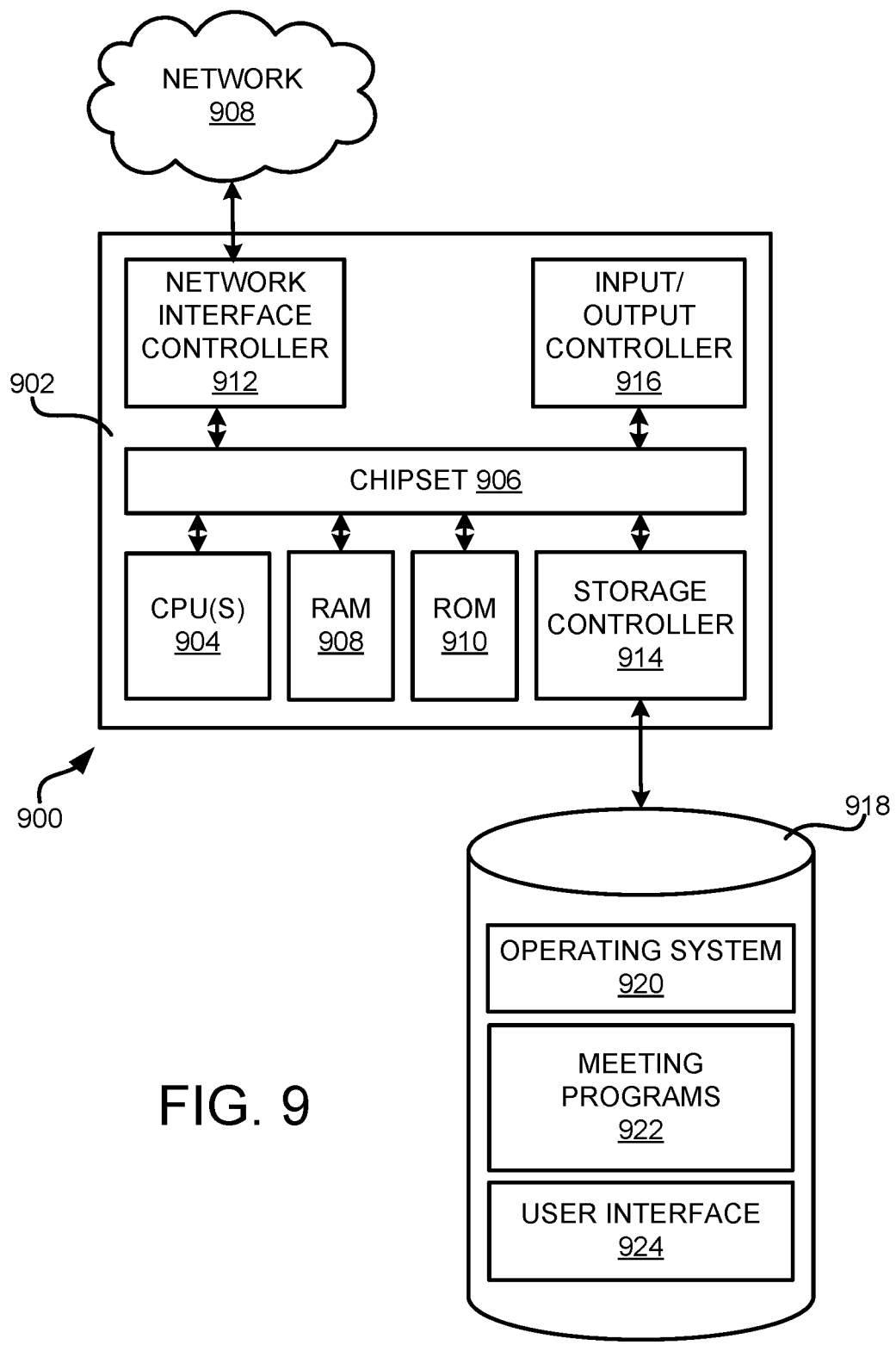
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 908. The chipset 906 can include functionality for providing network connectivity through a NIC 912, such as a gigabit Ethernet adapter. The NIC 912 is capable of connecting the computer 900 to other computing devices over the network 908. It should be appreciated that multiple NICs 912 can be present in the computer 900, connecting the computer to other types of networks and remote computer systems.

The computer 900 can be connected to a mass storage device 918 that provides non-volatile storage for the computer. The mass storage device 918 can store an operating system 920, meeting programs 922 for providing functionality associated with the meeting system 102, user interface 924, and data, which have been described in greater detail herein. The mass storage device 918 can be connected to the computer 900 through a storage controller 914 connected to the chipset 906. The mass storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the mass storage device 918 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 918 is characterized as primary or secondary storage, and the like.

For example, the computer 900 can store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the mass storage device 918 by detecting the physical states or characteristics of one or more particular locations within the physical storage units.

In addition to the mass storage device 918 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 can store an operating system 920 utilized to control the operation of the computer 900. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 918 can store other system or application programs and data utilized by the computer 900.

In examples, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to examples, the computer 900 has access to computer-readable storage media storing computer-executable instructions which, when executed by the computer 900, perform the various processes described above with regard to FIGS. 1-9. The computer 900 can also include computer-readable storage media for performing any of the other computer-implemented operations described herein.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or can utilize an architecture completely different than that shown in FIG. 9.

Based on the foregoing, it should be appreciated that technologies for utilizing a virtual assistant as a meeting agenda facilitator have been described herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
one or more processors; and
a non-transitory computer-readable storage medium having instructions stored thereupon which, when executed by the one or more processors, cause the system to:
determine, by processing one or more first audio signals associated with first speech that was uttered by a user and that was captured by one or more microphones associated with a voice-controlled device, that the first speech relates to a request for a virtual assistant to act as a meeting facilitator for a meeting between participants;
access, from an electronic message that was delivered to a data store associated with the virtual assistant, a meeting agenda that identifies agenda items for the meeting;
parse, based at least in part on the request for the virtual assistant to act as the meeting facilitator, the meeting agenda to identify a first agenda item and a second agenda item;
cause a message to be audibly output by one or more speakers of the voice-controlled device that introduces the first agenda item at a first time, the first agenda item associated with a predetermined duration of time that is less than a total duration of time scheduled for the meeting;
determine that the predetermined duration of time has elapsed from the first time;
cause, based on the predetermined duration of time having elapsed from the first time, a second message to be audibly output by the one or more speakers that introduces the second agenda item at a second time that is subsequent to the first time;
receive, at or after the second time and from the voice-controlled device, one or more second audio signals associated with second speech that was uttered by at least one of the participants and that was captured by the one or more microphones;
perform natural language processing (NLP) on the second audio signal to identify a follow-up action to perform after the meeting has ended;
access digital calendars associated with the participants; and
cause the follow-up action to be performed based at least in part on the digital calendars, wherein causing the follow-up action to be performed includes creating a follow-up meeting that includes sending a meeting invitation to one or more of the participants or another user.

2. The system of claim 1, wherein the instructions further cause the system to generate a meeting record for the meeting, wherein the meeting record includes a recording of the meeting and a text transcript of the meeting generated from the recording of the meeting, wherein the meeting record associates a first portion of the recording and a first portion of the text transcript with the first agenda item and a second portion of the recording and a second portion of the text transcript with the second agenda item.

3. The system of claim 1, wherein the instructions further cause the system to cause material to be presented on a computing device in an environment of one or more of the participants based on an indication of the material that is associated with one or more of the first agenda item or the second agenda item in the meeting agenda.

4. The system of claim 1, wherein the instructions further cause the system to:
   store follow-up action items determined during the meeting, wherein the follow-up action items include one or more follow-up messages to be delivered to one or more of the participants of the meeting; and
   provide the one or more follow-up messages to the one or more of the participants after the meeting.

5. The system of claim 1, wherein the electronic message comprises an email message or a text message.

6. A computer-implemented method comprising:
   identifying, via one or more computers associated with a virtual assistant, a request for the virtual assistant to act as a facilitator for a meeting;
   accessing, via the one or more computers and from an electronic message that was delivered to a data store associated with the virtual assistant, a meeting agenda that identifies agenda items for the meeting;
   parsing, based at least in part on the request for the virtual assistant to act as the facilitator, the meeting agenda to identify a first agenda item and a second agenda item;
   causing, via the one or more computers, a first message to be provided to participants of the meeting, wherein the first message is associated with the first agenda item;
   determining, via the one or more computers, to transition from the first agenda item to the second agenda item;
   causing, via the one or more computers, a second message to be provided to the participants of the meeting, wherein the second message is associated with the second agenda item;
   accessing, via the one or more computers, digital calendars associated with the participants of the meeting; and
   causing, via the one or more computers, one or more follow-up actions to be performed based at least in part on the digital calendars, wherein the one or more follow-up actions include sending at least one message to at least one of the participants or other user, the at least one message including a document.

7. The computer-implemented method of claim 6, wherein causing the first message to be provided to the participants of the meeting comprises providing a visual indication that is associated with the first agenda item.

8. The computer-implemented method of claim 6, wherein determining to transition from the first agenda item to the second agenda item comprises:
   accessing a meeting agenda that identifies a first duration of time associated with the first agenda item;
   determining that a current time is subsequent to the first duration of time; and
   determining to transition from the first agenda item to the second agenda item based, at least in part, on the current time being subsequent to the first duration of time.

9. The computer-implemented method of claim 6, further comprising generating a meeting record for the meeting, wherein generating the meeting record includes:
   generating one or more recordings for the meeting;
   generating data that includes one or more text transcripts from the one or more recordings, content presented during the meeting, and one or more follow-up items;
   associating a first portion of the data with the first agenda item;
   associating a second portion of the data with the second agenda item;
   indexing at least a portion of the data within a search index, wherein the search index is searchable by one or more search engines that are configured to provide one or more results in response to a query requesting information about the meeting; and
   including the one or more recordings, the one or more text transcripts, and the content presented during the meeting within the meeting record.

10. The computer-implemented method of claim 6, further comprising determining the one or more follow-up actions to be performed based, at least in part, on one or more of one or more audio signals received from one or more of the participants or a determination that one or more of the first agenda item or the second agenda item was partially covered.

11. The computer-implemented method of claim 6, further comprising causing, via the one or more computers, material to be presented on a display in an environment that includes one or more of the participants, wherein the material is presented during a time indicated by the meeting agenda.

12. The computer-implemented method of claim 6, wherein causing the one or more follow-up actions to be performed comprises providing, via the one or more computers, one or more documents to one or more users.

13. The computer-implemented method of claim 6, wherein causing the one or more follow-up actions to be performed comprises modifying the meeting agenda, via the one or more computers, to reflect an updated agenda item identified during the meeting.

14. A system, comprising:
   one or more processors; and
   a non-transitory computer-readable storage medium having instructions stored thereupon which, when executed by the one or more processors, cause the system to perform actions, comprising:
      identifying a request for a virtual assistant to act as a facilitator for a meeting;
      accessing, from an electronic message that was delivered to a data store associated with the virtual assistant, a meeting agenda that identifies agenda items for the meeting;
      parsing, based at least in part on the request for the virtual assistant to act as the facilitator, the meeting agenda to identify a first agenda item and a second agenda item;
      causing a first message, associated with the first agenda item, to be provided to one or more participants of the meeting;
      determining to transition from the first agenda item to the second agenda item;
      causing a second message, associated with the second agenda item, to be provided to the one or more participants;
      accessing digital calendars associated with the one or more participants of the meeting; and
      causing one or more follow-up actions to be performed based at least in part on the digital calendars, wherein the one or more follow-up actions include creating a follow-up meeting that includes sending a meeting invitation to at least one of the one or more participants.

15. The system of claim 14, wherein determining to transition from the first agenda item to the second agenda item comprises utilizing natural language processing (NLP) to determine that content associated with the second agenda item is being discussed by at least one of the one or more participants.

16. The system of claim 14, wherein determining to transition from the first agenda item to the second agenda item comprises:
   accessing a meeting agenda that identifies one or more of a first duration of time associated with the first agenda item or a time to start the first agenda item; and
   determining to transition from the first agenda item to the second agenda item based, at least in part, on the first duration of time or the time to start the first agenda item.

17. The system of claim 14, wherein the actions further comprise generating a meeting record for the meeting, wherein generating the meeting record includes:
   generating data that includes one or more text transcripts from one or more recordings of the meeting, and content presented during the meeting;
   indexing at least a portion of the data within a search index, wherein search index is searchable by one or more search engines that are configured to provide one or more results in response to a query requesting information about the meeting; and
   including the one or more recordings, the one or more text transcripts, and the content presented during the meeting within the meeting record.

18. The system of claim 14, wherein the actions further comprise determining the one or more follow-up actions to be performed based, at least in part, on one or more audio signals received from at least one of the one or more participants.

19. The system of claim 14, wherein the actions further comprise causing material to be presented on a display in an environment that includes at least one of the one or more participants, wherein the material is presented during a time indicated by a meeting agenda associated with the meeting.

20. The system of claim 14, wherein causing the one or more follow-up actions to be performed comprises sending a document to at least one of the one or more participants or one or more other users.

\* \* \* \* \*